United States Patent [19]

Meyer et al.

[11] Patent Number: 4,853,445
[45] Date of Patent: Aug. 1, 1989

[54] DIBUTYLTIN COMPOUNDS IN STYRENE MONOMER POLYMERIZATION

[75] Inventors: Bernard H. Meyer, Newtown Square; Joseph C. Kinslow, West Chester; Paul E. Arch, Wayne; D. Harper Meek, Newtown Square, all of Pa.

[73] Assignee: Arco Chemical Technology, Inc., Wilmington, Del.

[21] Appl. No.: 52,508

[22] Filed: May 21, 1987

[51] Int. Cl.⁴ ........................... C08F 2/18; C08F 12/08
[52] U.S. Cl. ..................................... 526/190; 526/272; 526/329.2; 526/340; 526/342; 526/346; 526/909; 526/910; 525/248; 525/298; 525/310; 525/313; 525/316; 524/178
[58] Field of Search .............. 526/190, 192, 272, 346, 526/909, 910, 329.2, 340, 342; 525/244, 298, 310, 248, 313, 316; 524/178

[56] References Cited

U.S. PATENT DOCUMENTS

| | | | |
|---|---|---|---|
| 3,632,670 | 1/1972 | Fujusaki et al. | 525/248 X |
| 4,113,672 | 9/1978 | Pillar | 524/397 X |
| 4,269,957 | 5/1981 | Gaylord et al. | 526/192 |

OTHER PUBLICATIONS

Concise Chem. and Tech. Dictionary, H. Bennett (ed.) Chemical Publishing Co., N.Y., N.Y., 769 (1974).

*Primary Examiner*—Joseph L. Schofer
*Assistant Examiner*—F. M. Teskin
*Attorney, Agent, or Firm*—Lewis J. Young

[57] ABSTRACT

In the suspension polymerization of styrene monomers in water using suitable suspension stabilizers, the only modifier needed has been found to be organotin compounds in amounts from 10 to 1000 ppm based on monomer. The product beads have a narrow bead size distribution.

9 Claims, No Drawings

DIBUTYLTIN COMPOUNDS IN STYRENE MONOMER POLYMERIZATION

BACKGROUND OF THE INVENTION

Free radical initiators, particularly peroxidic initiators such as benzoyl peroxide, are commonly used as the primary initiator, or catalyst, in the suspension polymerization of vinyl aromatic monomers such as styrene. These initiators, being predominantly oil soluble and water insoluble, are believed to react within the monomer droplets in suspension to cause the polymerization in the following manner:

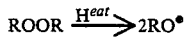

Grim U.S. Pat. No. 2,673,194, describes the suspension polymerization of vinyl aromatic monomers, whereby an oily monomer is suspended as droplets in an aqueous medium and polymer beads or particles are produced by the use of an oil-soluble polymerization catalyst, such as benzoyl peroxide. The suspending system of the Grim patent is comprised of finely divided, difficultly water-soluble, inorganic phosphates, and an anionic surface-active agent which serves as a modifier. As used in this art, compounds which act to increase the ability of the finely divided phosphate dispersant to stabilize suspensions are termed modifiers. The modifiers increase the ability of the phosphate dispersant to maintain stable suspensions with a greater proportion of monomer and/or polymer in the suspension polymerization medium. Among the modifiers listed by Grim are: sodium dodecylbenzene sulfonate, sodium tetradecyl sulfate, potassium stearate, and long chain alkyl sulfonates.

The suspension systems such as that of Grim produce polymer beads having a broad particle size distribution. The individual beads produced in suspension may range in diameter from less than 300 microns to above 200 microns with the average bead diameter being dependent upon the amount of suspending agent and modifier present in the system. The average bead diameter can be controlled to some extent by varying the parameters of the system such as the ratio of suspending agent to modifier or the ratio of suspending agent and modifier to monomer. Although the average diameter size is changed through such variations, nevertheless, beads will be produced whose particle size distribution is broad. For commercial reasons, it is highly desirable in this art to control the average particle size range within relatively narrow limits. This is especially true where the polymer beads are to be impregnated with a volatile expanding agent to produce polymer beads which will, upon heating, expand, e.g. in a mold, to fill the mold cavity and produce fused, expanded polymer articles.

One of the major uses of expandable polymer beads, particularly polystyrene beads, which are produced commercially by suspension polymerization, is in insulation applications such as insulation board. In manufacturing insulating board, it is common to mold a large (e.g. 4'X8'X20') billet of expanded polystyrene and subsequently cut the billet into slabs one or two inches thick for ultimate use as an insulation board. In preparing the large billets from expandable polymer beads, the beads are first pre-expanded to form non-fused, partially expanded beads having a bulk density of from 0.8–1.2 cf. The partially expanded beads are then charged to the billet mold, and heat, usually in the form of steam, is applied to fully expand the beads whereby they fill the mold, fuse, and form the billet.

In the billet-molding application, it is especially critical that the expandable polymer beads be relatively large and substantially spherical. If the beads are too small, then the expandable beads at the outer surface of the billet mold will fuse too soon, thereby excluding steam from the center of the mold. The resulting billet, therefore, has a center of unfused, expanded beads which is, of course, highly undesirable since any unfused portion of the billet is useless.

Hohenstein et al, in U.S. Pat. No. 2,652,392 reduced the amount of small particle size beads formed by adding less than 0.01 percent based on monomer of a water-soluble persulfate as modifier for the calcium phosphate stabilizer.

Wright, in U.S. Pat. No. 3,631,014, obtained narrow bead size distribution larger than 300 microns (45 mesh) in diameter by the use of at least 0.0003 percent by weight based on monomer of sodium bisulfite as modifier for the phosphate.

Wright, in U.S. Pat. No. 3,649,610, obtained narrow distribution of bead sizes larger than 750 microns (25 mesh) in diameter by the use of at least 0.01 percent by weight based on monomer of certain terminal vicinal hydroxyketo compounds as modifier for the phosphate.

Wright, in U.S. Pat. No. 3,755,282, obtained narrow distributions of bead size larger than 1200 microns (16 mesh) in diameter by the use of at least 0.0001 percent by weight based on monomer of $\alpha,\beta$-unsaturated carboxylic acids as modifier for the phosphate.

Wright, in U.S. Pat. No. 4,170,699, obtained narrow distribution of bead size larger than 600 microns (30 mesh) in diameter by the use of at least 0.01 percent by weight based on monomer of certain low molecular weight amino acids as modifier for the phosphate.

Pillar, in U.S. Pat. No. 4,113,672, added to 0.001–0.05 weight percent of dialkyl tin maleates or fumarates after the polymerization of the monomer to beads and during the impregnation of the beads to prevent degradation of the polymer molecular weight caused by the halogenated flame retardant agents to form expandable beads having improved molding characteristics.

BRIEF SUMMARY OF THE INVENTION

We have now found that the control of bead size distribution is very good for beads in the range of from 200 to 2000 microns in diameter by the use of dialkyl tin maleate or fumarate as modifier for the phosphate suspending agent in the aqueous suspension polymerization of styrene type monomers.

DETAILED DESCRIPTION OF THE INVENTION

This invention is applicable in the suspension polymerization of vinyl aromatic monomers such as styrene, alphamethylstyrene, vinyl toluenes, isopropylstyrene, t-butylstyrene, as well as copolymers prepared by the copolymerization of at least 50 percent by weight of a vinyl aromatic monomer with monomers such as butadiene, alkyl methacrylates, alkyl acrylates, acrylonitrile, maleic anhydride and polymers capable of further polymerization such as styrene-butadiene, styrene-isoprene, and polybutadiene rubbers. For the purpose of convenience, these monomers and polymers are referred to herein as styrene monomers. The styrene monomers may, of course, contain various additives such as plasticizers, lubricants, flame retardants or other additives.

The suitable suspending agents may be finely divided, difficultly water-soluble phosphates, protective colloids, and other inorganic salts such as carbonates and oxides. U.S. Pat. No. 2,673,194 includes those finely divided phosphates difficultly soluble in water containing for each phosphate group at least three equivalents of a metal, the carbonate of which is only slightly soluble in water, e.g. tricalcium phosphate, hydroxy-apatite, magnesium phosphate, etc. Advantageously, the amount of phosphate to be employed in this invention ranges from about 0.10 to 2.0% by weight based on monomer. The average particle size of polymer beads produced in the suspension polymerization depends primarily upon the total amount of phosphate suspending agent; for example, suspension with larger amounts of phosphate suspending agent yields beads of a smaller average diameter particle size.

The organo tin compounds suitable as bead size control agents may be, for example, the dialkyl tin maleates and fumarates, and the dialkyl tin dilaurates. The dialkyl tin maleates and fumarates useful in the invention can be made by reacting dialkyl tin dichloride with the appropriate acid, maleic or fumaric. The alkyl substituents may be the lower alkyl radicals having 1 to 20 carbon atoms, preferably 1 to 8, such as methyl, ethyl, propyl, butyl, isobutyl, and isooctyl. Although the tin maleates may be cyclic, having a ratio of tin to maleate of 1:1, the compounds are normally in the polymeric form

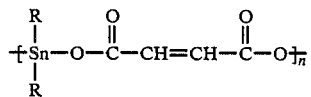

where R is the alkyl group as described above, and n is an integer. Most of these tin compounds are available commercially as stabilizers for polyvinyl chloride. The reaction of dialkyl tin halides with maleic acid or anhydride often leads to isomerization of all or part of the cis-maleate to the transfumarate structure. Some of the commercial stabilizers are sold as mixtures of the maleate and fumarate. All forms are suitable for the present invention. The tin compounds are useful in amounts between 10 and 1000 ppm, preferably 10 to 200 ppm, based on total monomer. The higher amounts of tin compound may be needed when higher amounts of phosphate suspending agent are used.

The process of the invention may be used with monomer to water ratios which vary from about 0.3 to 1.5 parts by weight monomer per 1.0 part by weight water. The invention is especially valuable in that generally high monomer to water ratios are used, and a higher proportion of monomer in the suspension system is, of course, preferred from an economic standpoint.

The time and temperature cycles for the polymerization may be those conventionally employed. Conveniently, the cycle described in the Grim patent above, or the two-stage temperature cycle described in D'Alelio U.S. Pat. N. 2,692,260 is employed.

The free radical catalysts which are added to the aqueous suspension system are the conventional oil-soluble oxidation catalysts such as organic peroxides, e.g. benzoyl peroxide and t-butyl perbenzoate. Other free radicals producing catalysts that may be used in the invention include azobisisobutyronitrile. Conventional amounts of these catalysts are used in the invention.

This invention is further illustrated by, but is not intended to be limited by, the following examples, wherein parts are parts by weight unless otherwise indicated.

EXAMPLE I

To 12 oz., crown-capped bottles were added 100 parts of water, 0.85 part of the dispersing agent, tricalcium phosphate, 0.2 part of polyethylene wax, the amounts of dibutyl tin maleate modifier shown in Table I, and 100 parts of styrene containing 0.42 part of the catalyst comprising 0.32 part of benzoyl peroxide and 0.1 part of t-butyl perbenzoate. The amount of dibutyl tin maleate is expressed as parts per million (ppm) based on the styrene monomer. The bottles were capped and tumbled endover-end in a heated oil bath at 90° C. for 6 hours. The bottles were cooled to room temperature, opened and acidified with hydrochloric acid to a pH of about 1.0 to dissolve the phosphate. The beads were separated by centrifuge, washed with water and air dried. The dried beads were subjected to screen analysis using U.S. Standard Sieves to determine median bead size. The results are shown in Table I.

TABLE I

| Dibutyl Tin Maleate, (ppm) | Bead Size, (mm) | Bead Size Distribution |
|---|---|---|
| 0 | Failed | None |
| 15 | 0.85 | Good |
| 30 | 0.62 | Good |
| 60 | 0.46 | Good |
| 75 | 0.49 | Good |
| 90 | 0.55 | Good |
| 120 | 0.54 | Good |
| 150 | 0.54 | Good |
| 165 | 0.51 | Good |

We claim:

1. In a process for producing polymer beads by suspending from 50 to 100 weight percent of a vinyl aromatic monomer and from 0 to 50 weight percent of at least one monomer selected from the group consisting of butadiene, alkyl methacrylates, alkyl acrylates, acrylonitrile, maleic anhydride, and polymers capable of further polymerization, selected from the group of styrene-butadiene rubbers, styreneisoprene rubbers, and polybutadiene rubbers, said monomers containing a monomer soluble, free radical producing catalyst in an aqueous medium with the aid of from 0.1 to 2.0 percent by weight based on total monomer of a suitable suspending agent and subjecting the suspension to an elevated temperature to cause said monomers to polymerize, the improvement for producing a narrow distribution of bead diameter sizes which comprises adding to said suspension between 10 and 1000 parts per million based on total monomer of an organotin compound as a modifier for the suspending agent.

2. The process of claim 1 wherein said polymerization produces polymer beads having an average particle size between about 200 and about 2000 microns in diameter.

3. The process of claim 1 wherein said vinyl aromatic monomer is styrene.

4. The process of claim 1 wherein said organotin compound is selected from the group consisting of a dialkyl tin maleate or dialkyl tin fumarate or mixtures thereof; said alkyl groups having from 1 to 20 carbon atoms in their structure.

5. The process of claim 1 wherein said organotin compound is a dialkyl tin dilaurate wherein said alkyl groups have 1 to 20 carbon atoms in their structure.

6. The process of claim 1 wherein said vinyl aromatic monomer is copolymerized with less than 50 percent by weight of maleic anhydride.

7. In a process for producing polymer beads by suspending from 50 to 100 weight percent of a vinyl aromatic monomer and from 0 to 50 weight percent of at least one monomer selected from the group consisting of butadiene, alkyl methacrylates, alkyl acrylates, acrylonitrile, maleic anhydride, and polymers capable of further polymerization, selected from the group of styrene-butadiene rubbers, styreneisoprene rubbers, and polybutadiene rubbers, said monomers containing a monomer-soluble, free radical producing catalyst in an aqueous medium with the aid of from 0.1 to 2.0 percent by weight based on total monomer of a finely divided, difficultly water-soluble phosphate suspending agent and subjecting the suspension to an elevated temperature to cause said monomer to polymerize, the improvement for producing a narrow distribution of bead sizes which comprises adding to said suspension between 10 and 1000 parts per million based on total monomer of an organotin compound as a modifier for the phosphate.

8. The process of claim 7 wherein the phosphate suspending agent is tricalcium phosphate.

9. In a process for producing polymer beads by suspending from 50 to 100 weight percent of a vinyl aromatic monomer and from 0 to 50 weight percent of at least one monomer selected from the group consisting of butadiene, alkyl methacrylates, alkyl acrylates, acrylonitrile, maleic anhydride, and polymers capable of further polymerization, selected from the group of styrene-butadiene rubbers, styreneisoprene rubbers, and polybutadiene rubbers, said monomers containing a monomer soluble, free radical producing catalyst in an aqueous medium with the aid of from 0.1 to 2.0 percent by weight based on total monomer of a suitable suspending agent and subjecting the suspension to an elevated temperature to cause said monomer to polymerize, the improvement for producing a narrow distribution of bead diameter sizes which comprises adding to said suspension as a modifier for the suspending agent between 10 to 1000 parts per million based on total monomer of a compound selected from the group consisting of dialkyl tin maleate, dialkyl tin fumarate, and mixtures thereof wherein the alkyl groups have from 1 to 20 carbon atoms in their structure.

* * * * *

UNITED STATES PATENT AND TRADEMARK OFFICE
CERTIFICATE OF CORRECTION

PATENT NO. : 4,853,445

DATED : August 1, 1989

INVENTOR(S) : Bernard H. Meyer, Joseph C. Kinslow, Paul E. Arch, Harper Meek

It is certified that error appears in the above-identified patent and that said Letters Patent is hereby corrected as shown below:

Title page and Column 1, line 2, the title should read as follows:

--DIBUTYLTIN COMPOUNDS IN STYRENE MONOMER POLYMERIZATION--

Signed and Sealed this

Twenty-ninth Day of May, 1990

*Attest:*

HARRY F. MANBECK, JR.

*Attesting Officer*     *Commissioner of Patents and Trademarks*